(12) United States Patent
Choo

(10) Patent No.: US 6,430,321 B1
(45) Date of Patent: Aug. 6, 2002

(54) TEXT ENHANCEMENT

(75) Inventor: Tse Huong Choo, Singapore (SG)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/162,423

(22) Filed: Sep. 28, 1998

(51) Int. Cl.[7] .............................. G06K 9/32; G09G 5/00; H04N 1/393
(52) U.S. Cl. ..................... 382/299; 382/298; 382/295; 382/279; 345/615; 358/451
(58) Field of Search ................................. 382/299, 298, 382/295, 293, 279, 256, 290, 112; 358/451, 448, 447; 345/615, 472, 472.1, 472.2; 346/660

(56) References Cited

U.S. PATENT DOCUMENTS

| 4,628,534 A | * | 12/1986 | Marshall | 382/41 |
| 4,742,553 A | * | 5/1988 | Irwin | 382/47 |
| 5,029,108 A | * | 7/1991 | Lung | 364/519 |
| 5,479,584 A | * | 12/1995 | Curry | 395/102 |
| 5,526,468 A | * | 6/1996 | Kolb et al. | 375/102 |
| 5,555,557 A | * | 9/1996 | Mailloux | 382/299 |
| 6,028,910 A | * | 2/2000 | Kirchner et al. | 378/22 |

* cited by examiner

Primary Examiner—Leo Boudreau
Assistant Examiner—Yosef Kassa

(57) ABSTRACT

A method of enhancing data which is rendered as a bi-tonal bit-mapped image for subsequent printing on a printer. The method involves receiving a source bit-mapped image at a low resolution for printing on a printer at a higher resolution. The bitmap is convoluted with a gradient operator to generate horizontal and vertical gradient values for each pixel. The bitmap is then expanded by a predetermined factor to the higher resolution for sending to the printer, and finally a value is assigned to each pixel in the expanded bitmap which is dependent on the value of pixels in the source bitmap and also the horizontal and vertical gradient values.

8 Claims, 7 Drawing Sheets

|  |  |  |
|---|---|---|
| −1 | 0 | +1 |
| −2 | 0 | +2 |
| −1 | 0 | +1 |

FIG. 2a

|  |  |  |
|---|---|---|
| −1 | −2 | −1 |
| 0 | 0 | 0 |
| +1 | +2 | +1 |

FIG. 2b

TEXT ENHANCEMENT

This invention relates to a method of enhancing text which is rendered as a bi-tonal bit-mapped image for subsequent printing on a printer.

BACKGROUND OF THE INVENTION

It is common practice for a printer to be connected to and controlled by a computer system, so that digital information handled by the computer system can be printed out. An example of this type of set up is shown in FIG. 1.

Typically, the computer system 207 will have an operating system (OS), such as a version of the Microsoft (MS) Windows operating system, available from the Microsoft Corporation, USA. With this operating system installed, the computer system can run various application processes such as a word processing package or a spreadsheet package. When an application 201 desires to print information on the printer 205, the application process makes an initial call to a graphical device interface (GDI) 202 and, after receiving confirmation that the call was successful, proceeds to send print data to the GDI. The GDI is a part of the MS Windows OS and provides a general interface between applications 201 running under the OS and graphical devices supported by the OS, e.g. displays 206 and printers 205.

After receiving a call from an application 201 to initiate printing, the GDI 202 interprets the print data received from the application and sends related print data to a printer driver 203. The related print data is device-independent and will, in most cases, closely match the print data received from the application 201. The printer driver 203 translates the device-independent print data from the GDI into signals which the printer 205 can use to print the original information from the application. These printer driver signals are usually dependent on and specific to the printer type or model. Accordingly, the printer driver is usually a proprietary piece of software separate from the OS that is provided by the manufacturer of the printer 205.

In general, there are two distinct types of device independent print data which are sent to the printer driver 203. These are often termed scalable and non-scalable print data. Scalable print data includes vector graphic data, such as scalable primitives defining ellipses and squares, and scalable fonts, such as Postscript™. This scalable print data is sent as graphical or text commands or instructions to the printer driver.

Non-scalable print data includes raster graphic data, which is generally in the form of a bitmap or bitmapped image. This non-scalable print data is sent as bitmap data to the printer driver. Normally, the non-scalable bitmaps contain renderings of photographic images or graphics, but on occasions these non-scalable bitmaps contain renderings of text. The term "text" in this context includes individual symbols, signs, glyphs, icons, characters, or combinations and multiples thereof.

A photographic image often contains shades and is therefore typically rendered as grey-scale or multi-tonal bitmapped image in the print data. The bitmapped image is said to have depth due to the picture elements (pixels) having values other than zero or one. In contrast, text is generally displayed as black on white or one colour on another colour. Text is therefore typically rendered as a 1 bit or bi-tonal bit-mapped image in the print data.

From the foregoing it can be appreciated that text may be sent to a printer driver either as a scalable font or as a bi-tonal bitmapped image. Scalable fonts are commonly used when, for example, a document is created in a word processing application and is printed directly from that application to a local or networked printer. In contrast, bi-tonal bitmapped images are commonly used when, for example, a document utilising embedded fonts is imported to an application for printing directly from that application.

Normally, the resolution of bitmapped images sent to the printer driver by the operating system is optimised (i.e. made equal) to the maximum resolution of the printer, e.g. both resolutions equal to 300 dots-per-inch (dpi). Scalable print data, such as scalable fonts, will therefore be printed at the same resolution as bitmapped images, such as bitmapped fonts. However, recent advances in the technology of printers developed by certain manufacturers has lead to higher printer resolutions becoming available, e.g. 600 dpi and 1200 dpi. Ordinarily, manufacturers of these printers provide associated printer drivers capable of (i) processing print data at the higher resolutions and (ii) sending signals at these higher resolutions to the printer so that higher quality print outs can be obtained, e.g. 600 dpi and 1200 dpi.

In an effort to optimise the resolution of bitmapped images sent to these high resolution printer drivers, the application or operating system could render the original images at the higher resolution. However, this high resolution rendering would require the application or operating system to be modified, which may not be commercially acceptable to a user. Furthermore, whereas a manufacturer can make a proprietary high resolution printer driver compatible with a printer with relative ease, the application processes and the operating system are generally not proprietary, and any resulting incompatibility may lead to significant increases in complexity and computational demands in the computer system. This consequence is undesirable.

Accordingly, it is known for high resolution printer drivers to report a relatively lower resolution (e.g. 300 dpi) to the operating system. Thus, the resolution capability of the system is compromised in favour of a more compatible and simpler solution. A consequence of this is that scalable print data, such as scalable fonts, are printed at the higher resolution (e.g. 600 dpi) whilst bitmapped images, such as bitmapped fonts, are printed at the lower resolution (e.g. 300 dpi). This consequence too is undesirable.

The two prior art solutions for dealing with higher resolutions printers both have their respective drawbacks. A user is thus faced with a dilemma of which solution to implement in his computer system. In this case neither prior art solution is totally satisfactory.

SUMMARY OF THE INVENTION

The present invention provides a enhancement technique which works by enhancing data that is depicted in 1-bit bitmaps. The technique in accordance with the invention may be applied to enhance line art data. However, enhancement is particularly noticeable when the technique is applied to text data. Uses for this technique include cases where a printer driver is invoked to handle bitmaps passed to it by a computer's operating system. In particular, the technique is especially useful in cases where the bitmaps being passed to the printer driver are sub-optimal and can be enhanced prior to sending to a printer. Such cases include situations where bitmaps are formatted at one resolution (e.g. 300 dpi), but the printer driver internally renders them at a higher resolution (e.g. 600 dpi). Also, if the printer device is capable of handling a higher resolution than that used by the operating system, the invention may be applied to scale smoothly from a lower dpi to a higher dpi, leading to text or line art graphics that appears as if it were rendered at a higher dpi and not the original lower dpi it was received at.

The method according to the invention involves expanding each source pixel of a bitmap into a plurality of pixels and varying the pixel intensities (0s or 1s) of the expanded pixels. In particular, the pixel intensities are varied according to results of a gradient convolution operation performed on the original bitmap. Ideally, the varying step also takes into account the values of the source pixels of the bitmap. This process may involve varying each expanded pixel intensity in dependence solely on the associated source pixel, or in dependence additionally on neighbouring source pixels.

Suitably, the method according to the invention includes the step of receiving a source bit-mapped image at a low resolution for printing on a printer at a higher resolution. The higher resolution is preferably a multiple of the lower resolution. Ideally, the higher resolution is an even multiple of the lower resolution, for example, twice the lower resolution.

A method in accordance with the invention has the advantage that it allows an application or operating system to supply source bit-mapped images to a printer driver at a low resolution but still benefit from the higher resolution of a printer to which the images are being sent. This enables the application or operating system to operate at the low resolution in an efficient manner without modification. At the same time the signals output to the printer may be optimised to the resolution of the printer. Consequently, simplicity is maintained in the computer system whilst providing enhanced text or line art graphics in print outs.

The extent and scope of the present invention is defined in the appended Claims to which reference should now be made.

The technique enhances data, in particular text and line art, depicted in the 1-bit source image by considering each source pixel in turn and varying the pixel-intensities in the resulting 2×2 pixel expansion for each source pixel. This approach allows the text or line art to be smoothed out in the process of scaling/expansion.

Bisonal (1-bit deep) bitmaps are scaled by a factor of 2 using this technique. When these bitmaps depict text, this technique has the effect of smoothly scaling the text as well, leading to improved print quality.

The basis of smoothing the edges of the text or line art depicted in source bitmaps is the stepwise application of both the horizontal and vertical Sobel operators over the source image to produce intensity gradients which are used to determine if the 2×2-pixel expansion of a given source pixel needs to have its diagonally-opposite corner pixels modified. Selected corner pixels take on the intensity of their original surrounding pixels if those surrounding source pixels are found to be uniform; otherwise they are set to the original colour of the source pixel being considered.

DESCRIPTION OF THE DRAWINGS

FIG. 2a is a table showing the values of a horizontal Sobel operator for use in the method according to the invention.

FIG. 2b is a table showing the values of a vertical Sobel operator for use in the method according to the invention.

FIG. 5a is a flowchart illustrating the decision steps taken by the printer driver in considering modification of the expanded pixel a.

DETAILED DESCRIPTION OF SPECIFIC EMBODIMENTS OF THE INVENTION

An embodiment of the invention will now be described, by way of example, with reference to the printer and computer system shown in FIG. 1. The resolution of the printer 205 is 600 dpi, whilst the resolution reported by the printer driver 203 to the GDI 202 is 300 dpi.

Computer System

Figure 1:
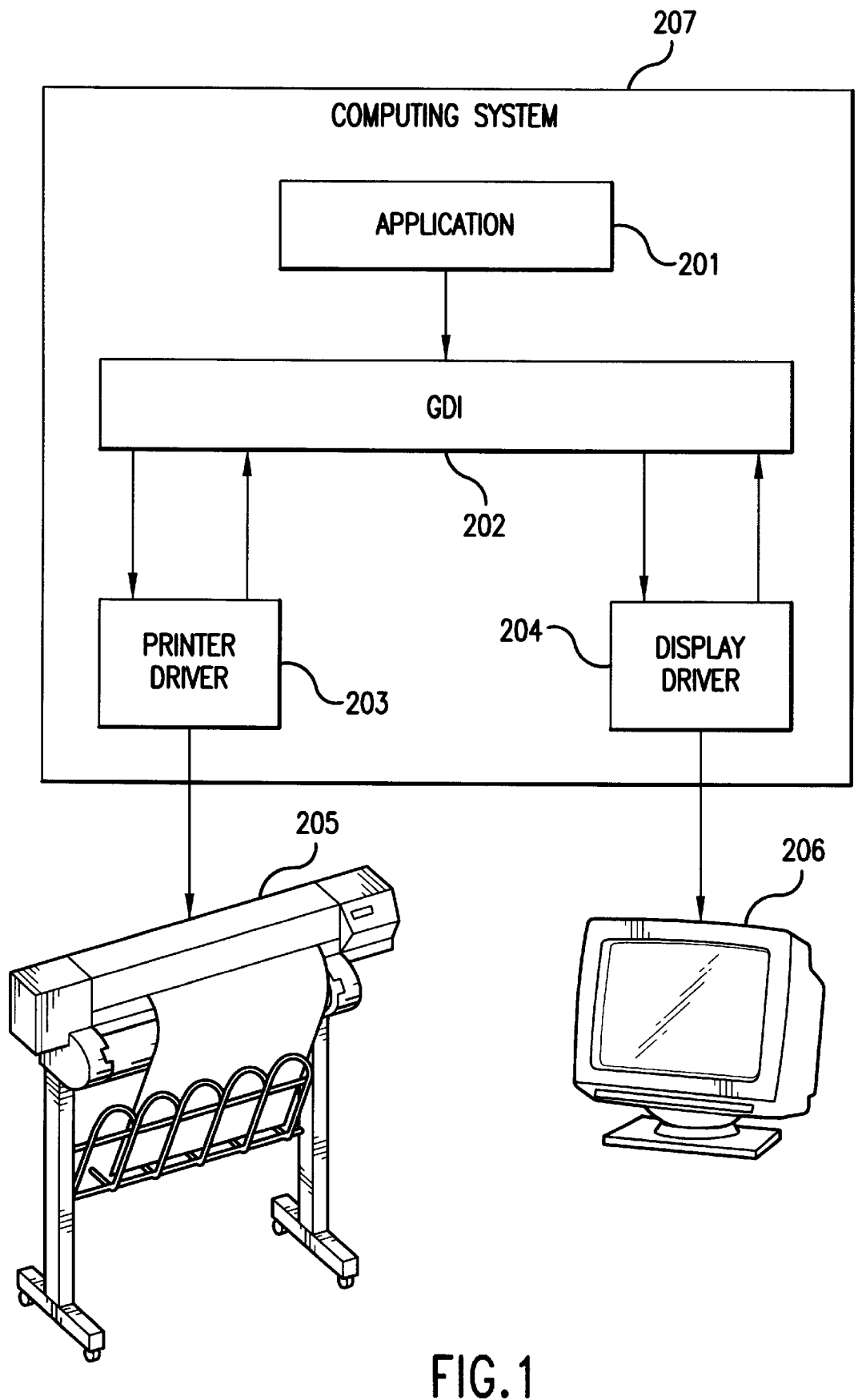
FIG. 1 is a simplified block diagram of the organisation of a computer system which includes drivers for a printer and a display.

In FIG. 1, the application 201 is a document-reading application for reading, viewing, navigating and printing documents. For example, the application may be Acrobat Reader™ available from Adobe™ Systems Incorporated, USA, which permits reading and printing of documents in the Adobe™ Portable Document Format (PDF). The format, structuring and layout of a PDF document and the particulars of the document processing are not directly related to the present invention and will not be described in any detail here; full information on these processes is available in various readily available publications.

A PDF document may contain both graphics and text. An individual page of a PDF document is divided into a number of distinct rectangular shaped regions which contain either graphics or text. The text may be coded with reference to either a standard font type or to an embedded font which is included with the document. When a user of the computer system 207 instructs the application 201 to print a page of a PDF document, the application 201 sends print data to the GDI 202 at a maximum resolution of 300 dpi. This print data contains information stating the position and size of each region on the page together with information of what is to be printed in each region.

A grey-scale photographic image in a first region will be sent to the GDI 202 as a multi-tone bitmapped image rendered at 300 dpi by the application. Another region containing text in a scalable font recognised by the GDI and printer driver will be sent to the GDI 202 as scalable print data. This scalable print data includes an initial command stating the font to be used together with an alphanumeric string specifying the actual text. Another region containing text in an embedded font, such as an Adobe™ Type 1 font, will be sent to the GDI 202 as a bi-tonal or 1-bit bitmapped image rendered at 300 dpi by the application.

The information received by the GDI 202 is passed onto the printer driver 203 without any substantial changes. The printer driver 203 processes the text sent as a 1-bit bitmapped image according to the following techniques in accordance with the invention. Images which are not sent as 1-bit bitmapped images are processed by the printer driver in the normal manner known to those skilled in the art of printing systems.

It is noted that the 1-bit bitmapped image has pixels which are considered to have discrete intensity values of either 0 (black) or 1 (white).

Gradient Operator

Figures 2A, 2B:
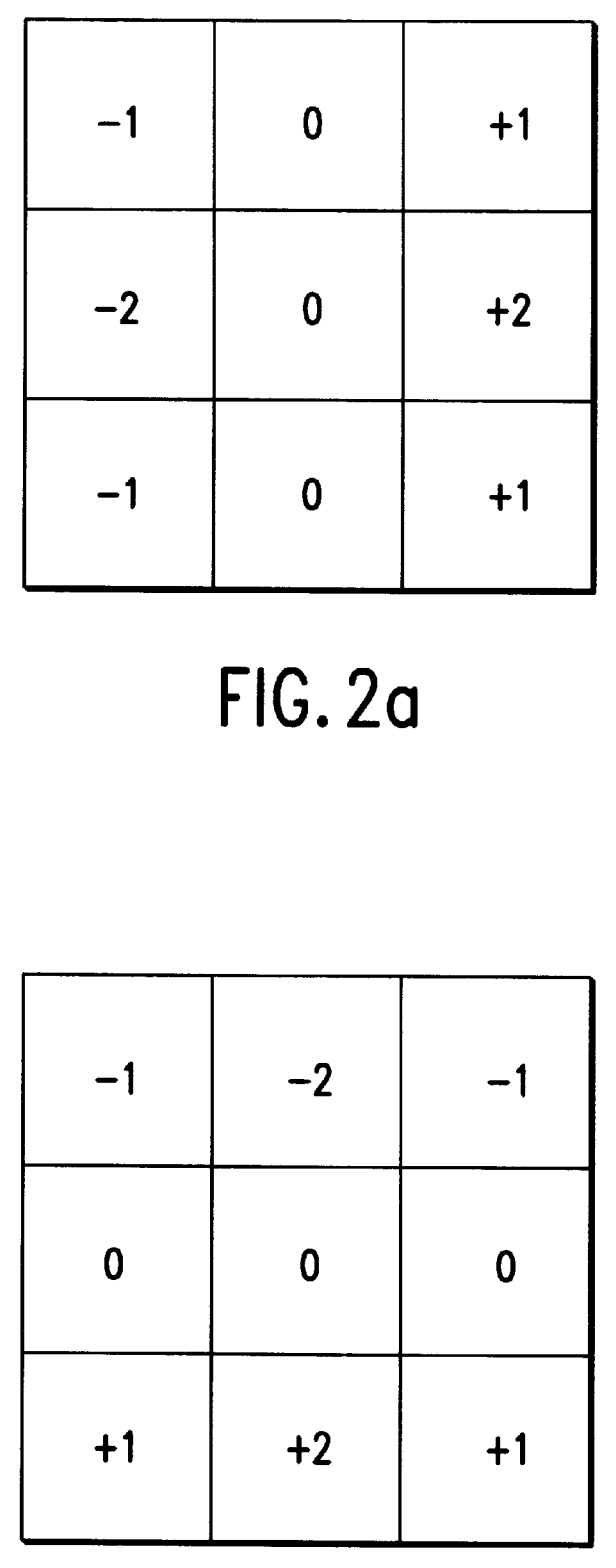

A 1-bit bitmapped image of text (source bitmap) received by the printer driver 203 is first convoluted by the printer driver with a standard horizontal Sobel operator of the form shown in FIG. 2a. The resulting array has the same dimensions as the source bitmap and contains an intensity gradient value gx in the horizontal direction for each pixel in the source bitmap. A similar convolution operation is performed with a standard vertical Sobel operator (shown in FIG. 2b) over the source bitmap. This operation produces an intensity gradient value gy in the vertical direction for each pixel in the source bitmap. The results of these convolution operations are held in a spatial gradient matrix which contains gradient intensity values gx and gy for each pixel of the source bitmap. The horizontal and vertical Sobel operators or masks perform a two dimensional spatial gradient measurement on the source bitmap and emphasise regions of high spatial gradient. These regions generally correspond to the edges of text characters that may be enhanced to the higher resolution of the printer. It is possible for the Sobel operators to be substituted with other types of gradient operators known to those skilled in the art of image processing, such as Prewitt or Kirsch operators.

Pixel Expansion

Aside from the gradient operations performed by the printer driver, the source bitmap received by the printer driver 203 is also scaled by a factor of two, from the resolution of 300 dpi used by the operating system to the resolution of 600 dpi used by the printer driver. This process is known as pixel replication. The resulting expanded bitmapped image has dimensions that are twice that of the original but with the same bit depth (1-bit).

Figure 3:
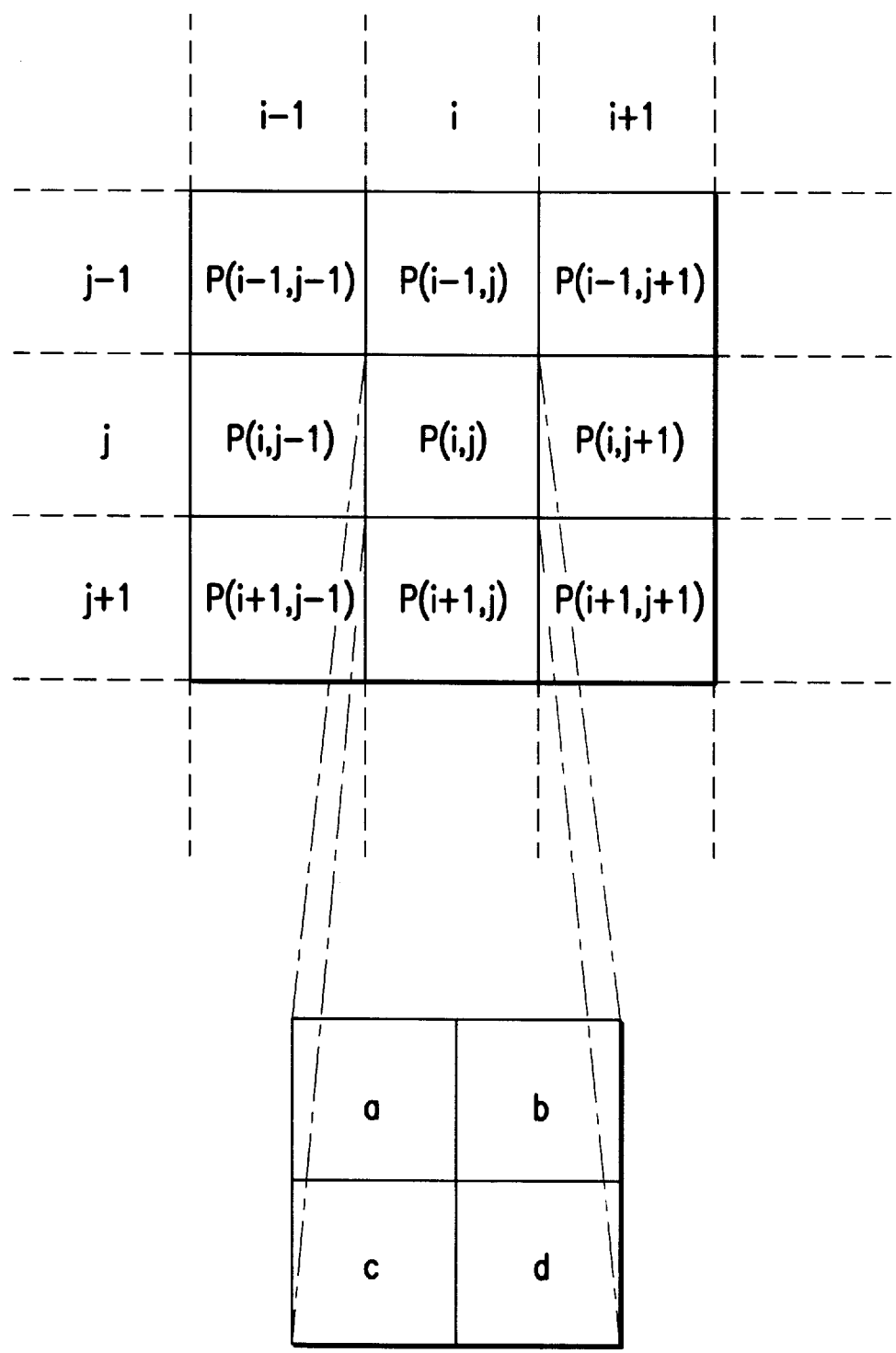
FIG. 3 is a diagram showing a 3×3 pixel block from the source bitmap and a 2×2 pixel expansion of the centre source pixel.

FIG. 3 shows a 3×3 pixel block from the source bitmap with the centre pixel in the jth row and ith column denoted as P(i,j). The surrounding pixels in the i−1th and i+1th columns and j−1th and j+1th rows are labelled accordingly. Expansion of the source bitmap by a factor of 2 causes each source pixel to be expanded to a 2×2 pixel block. This process is illustrated in FIG. 3 for the centre pixel P(i,j). The 2×2 pixel block has pixel elements labelled a, b, c, and d.

Pixel Value Assignment

Figure 4:
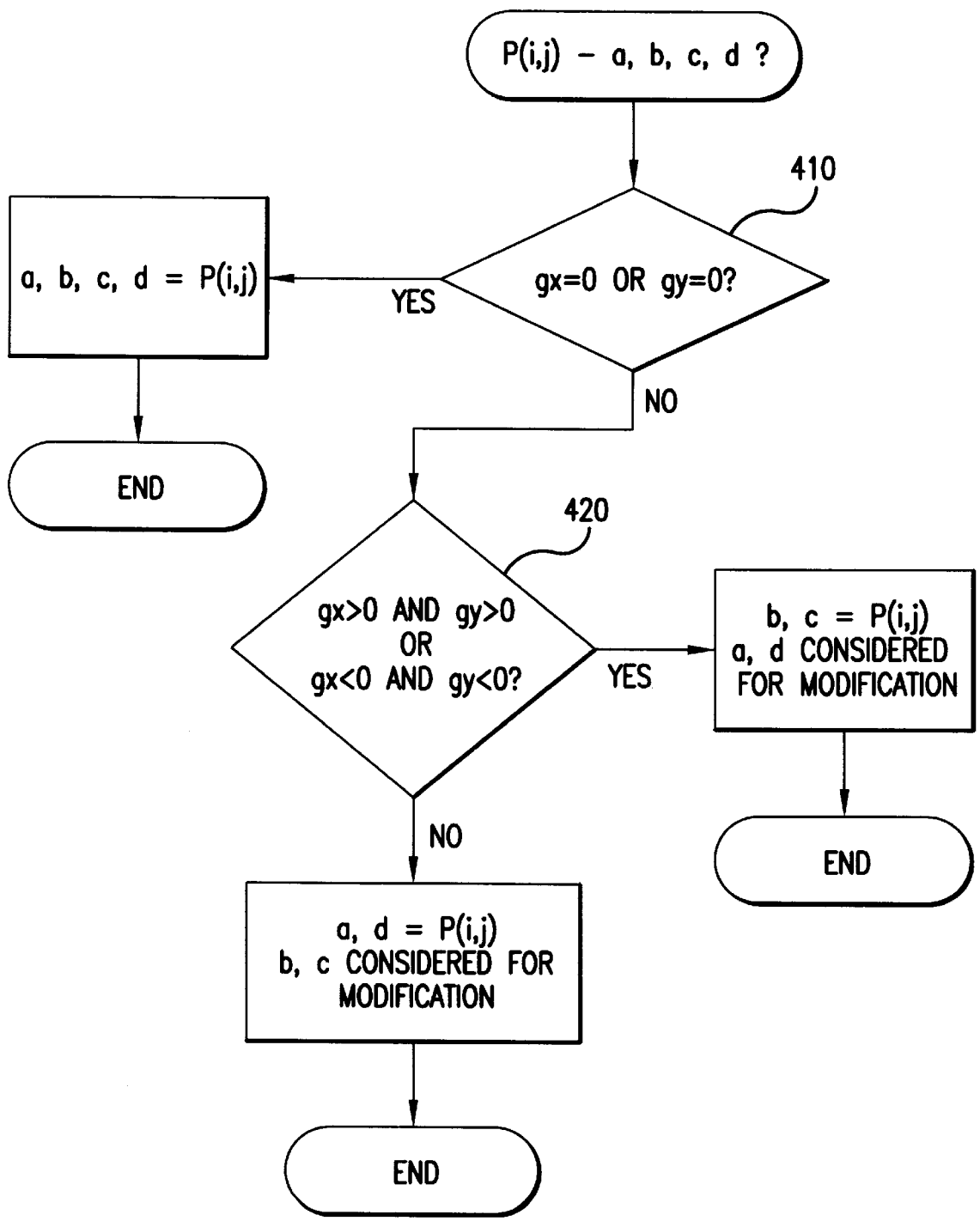
FIG. 4 is a flowchart illustrating the steps performed by the printer driver for deciding which expansion pixels are considered for modification.

The assignment of values to the expanded pixel elements a, b, c, and d for P(i,j) will now be described with reference to FIGS. 4, 5, and 6.

In known systems, the 2×2 pixel block produced as a result of expanding P(i,j) would have the same intensity values as the associated source pixel P(i,j). In accordance with the invention, modifications are performed at selected corner pixels of the 2×2 pixel block. The basis for this selection is the computed intensity gradients gx and gy at P(i,j). Depending on the values of gx and gy, three outcomes for the selection process are possible. The steps performed by the printer driver for arriving at these three outcomes for the source pixel P(i,j) are illustrated in the flowchart of FIG. 4, to which reference should now be made.

If the result of the decision step 410 is yes, i.e. gx=0 or gy=0, then no corner pixels are selected for modification. The resulting 2×2 pixel block has intensities that are equal to the original pixel being considered, i.e. a, b, c, and d are assigned the binary value from P(i,j). This is the case when the values of gx and gy indicate that there is no net bias in the layout of the source pixels and no modifications to smooth out edges is required.

If the result of the decision step 420 is yes, i.e. gx>0 and gy>0 or gx<0 and gy<0, then the upper-left and lower-right corners (a and d) are considered for modification. The remaining two pixels (b and c) take on the binary intensity value of the original source pixel P(i,j). The upper-left and lower-right corner pixels of the 2×2 expansion either take on the intensity of the surrounding corner pixels to smooth out edges, or the original intensity of the current source pixel. This choice is dependent on a further decision process.

If the result of the decision step 420 is no, i.e. gx<0 and gy>0 or gx>0 and gy<0, then the upper-right and lower-left corners (b and c) are considered for modification. The remaining two pixels (a and d) take on the binary intensity value of the original source pixel P(i,j). The upper-right and lower-left corner pixels of the 2×2 expansion either take on the intensity of the surrounding corner pixels to smooth out edges, or the original intensity of the current source pixel. This choice is again dependent on a further decision process.

Figure 5B:
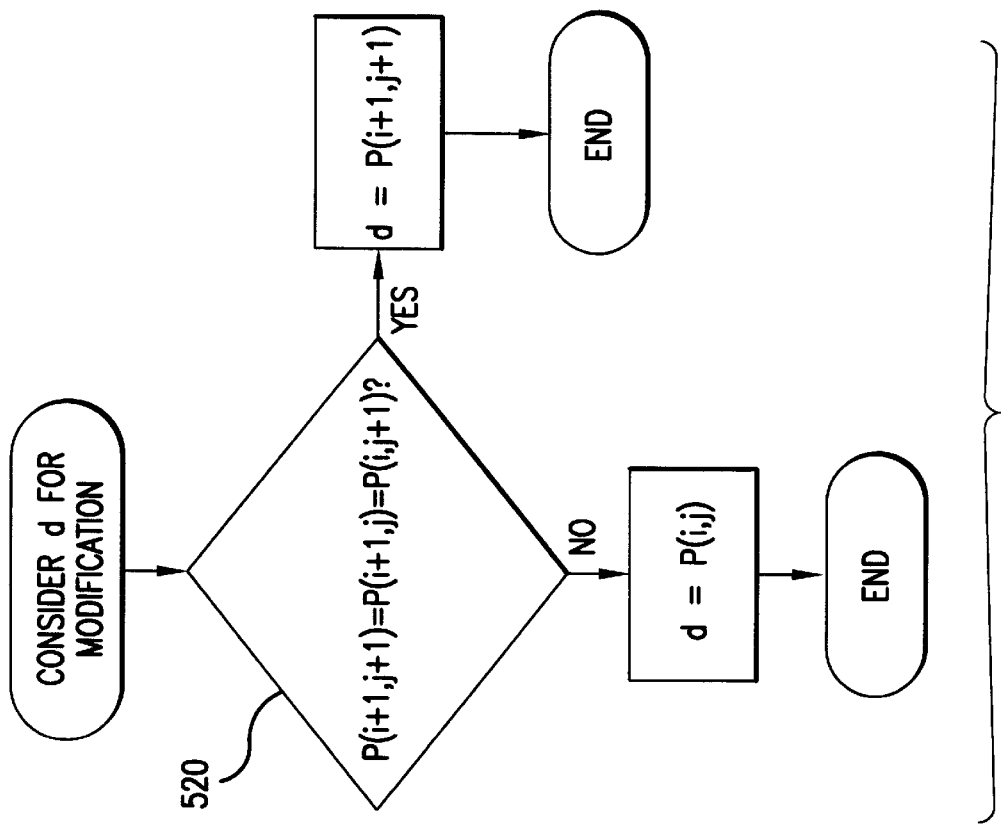
FIG. 5b is a flowchart illustrating the decision steps taken by the printer driver in considering modification of the expanded pixel d.
Figure 5A:
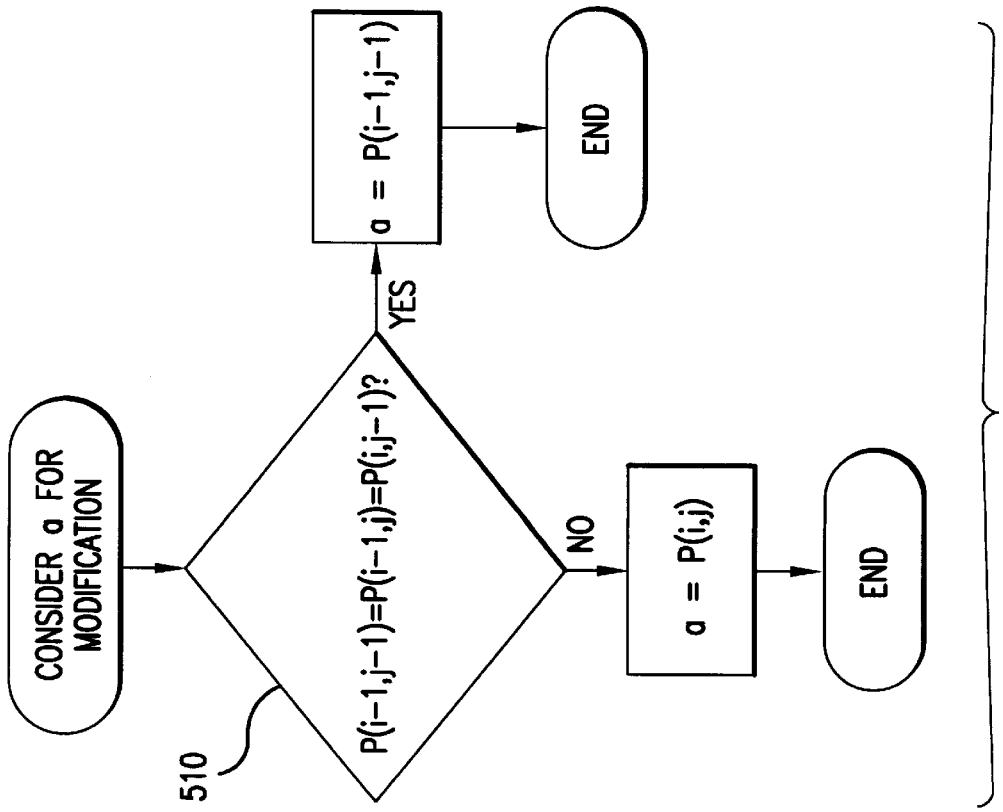

FIGS. 5a and 5b are flowcharts illustrating the decision steps taken by the printer driver in considering modification of expanded pixels a and d. In FIG. 5a, the decision step 510 considers the intensities of the three surrounding pixels P(i−1,j−1), P(i−1,j) and P(i,j−1) which are in the general direction from P(i,j) corresponding to the upper-left location of the expanded pixel a (see FIG. 3). If these three pixel intensities are equal, e.g. all black or all white, then the value of the expanded pixel a is made equal to this intensity, regardless of the intensity of P(i,j). Otherwise, the value of the expanded pixel a is made equal to the intensity of P(i,j). Similarly, in FIG. 5b, the decision step 520 considers the intensities of the three surrounding pixels P(i+1,j+1), P(i+1,j) and P(i,j+1) which are in the general direction from P(i,j) corresponding to the lower-right location of the expanded pixel d. If these three pixel intensities are equal then the value of the expanded pixel d is made equal to this intensity. Otherwise, the value of the expanded pixel a is made equal to the intensity of P(i,j).

Figure 6B:
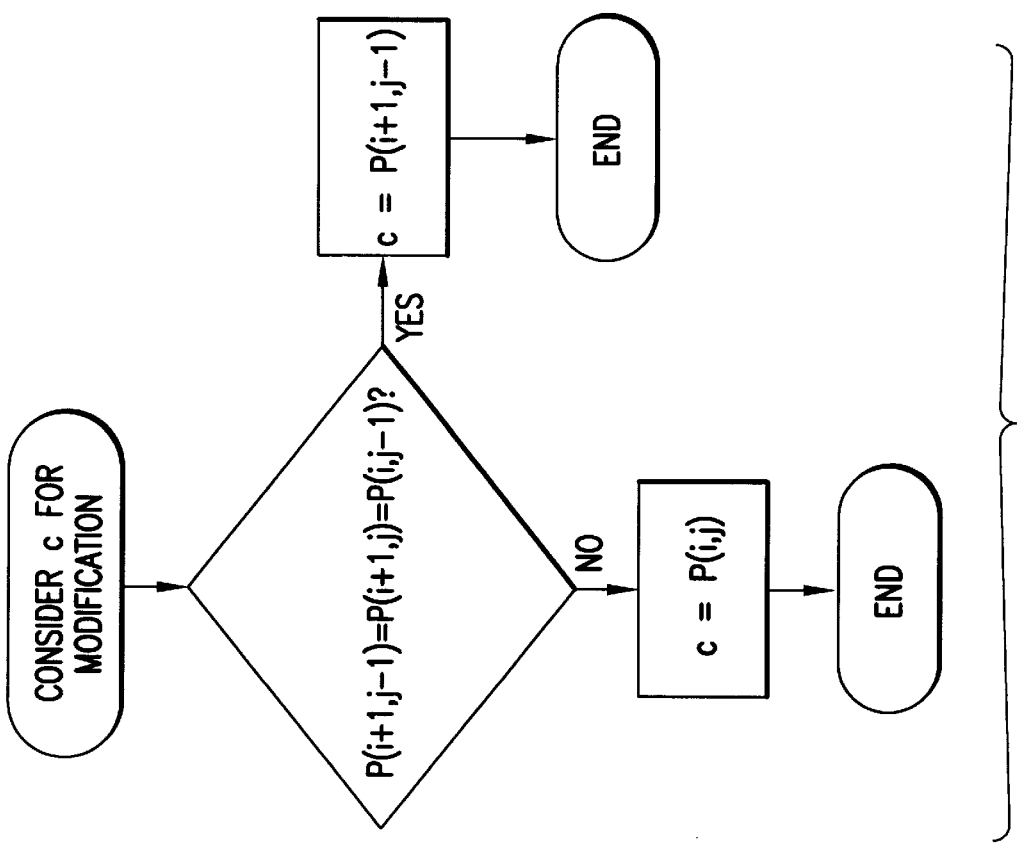
FIG. 6b is a flowchart illustrating the decision steps taken by the printer driver in considering modification of the expanded pixel c.
Figure 6A:
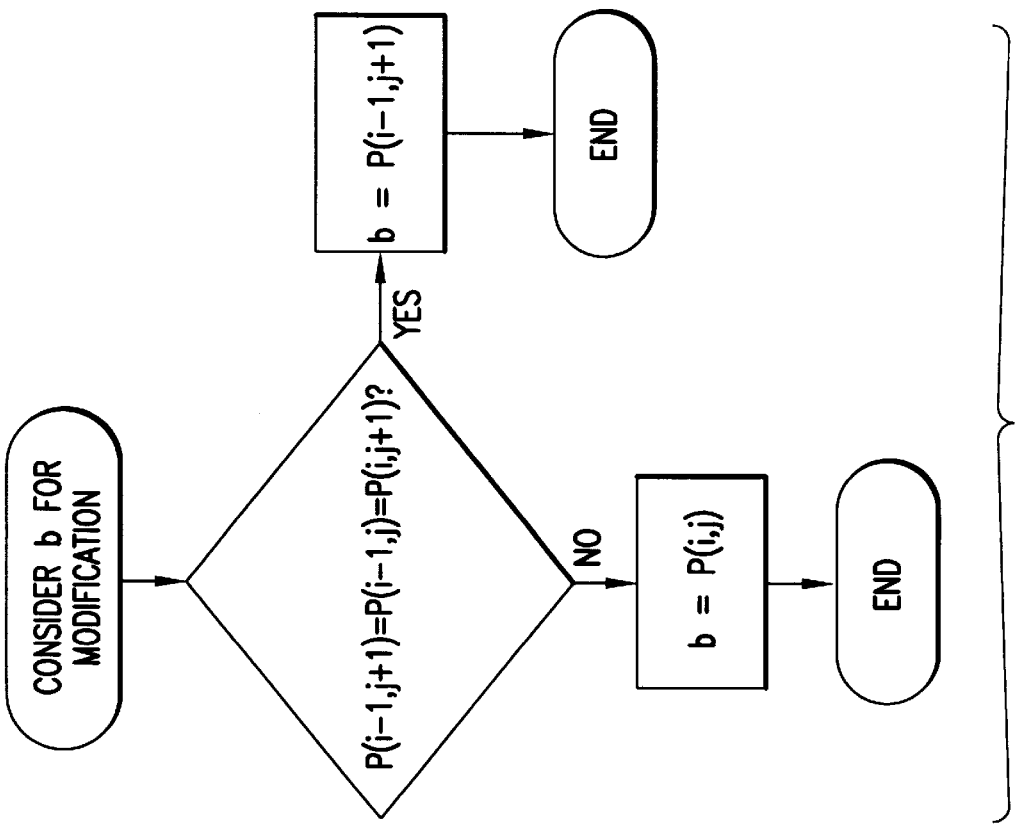
FIG. 6a is a flowchart illustrating the decision steps taken by the printer driver in considering modification of the expanded pixel b.

FIGS. 6a and 6b are flowcharts illustrating the decision steps taken by the printer in considering modification of expanded pixels b and c. These decision steps are equivalent to those described with reference to FIGS. 5a and 5b.

Figure 7:
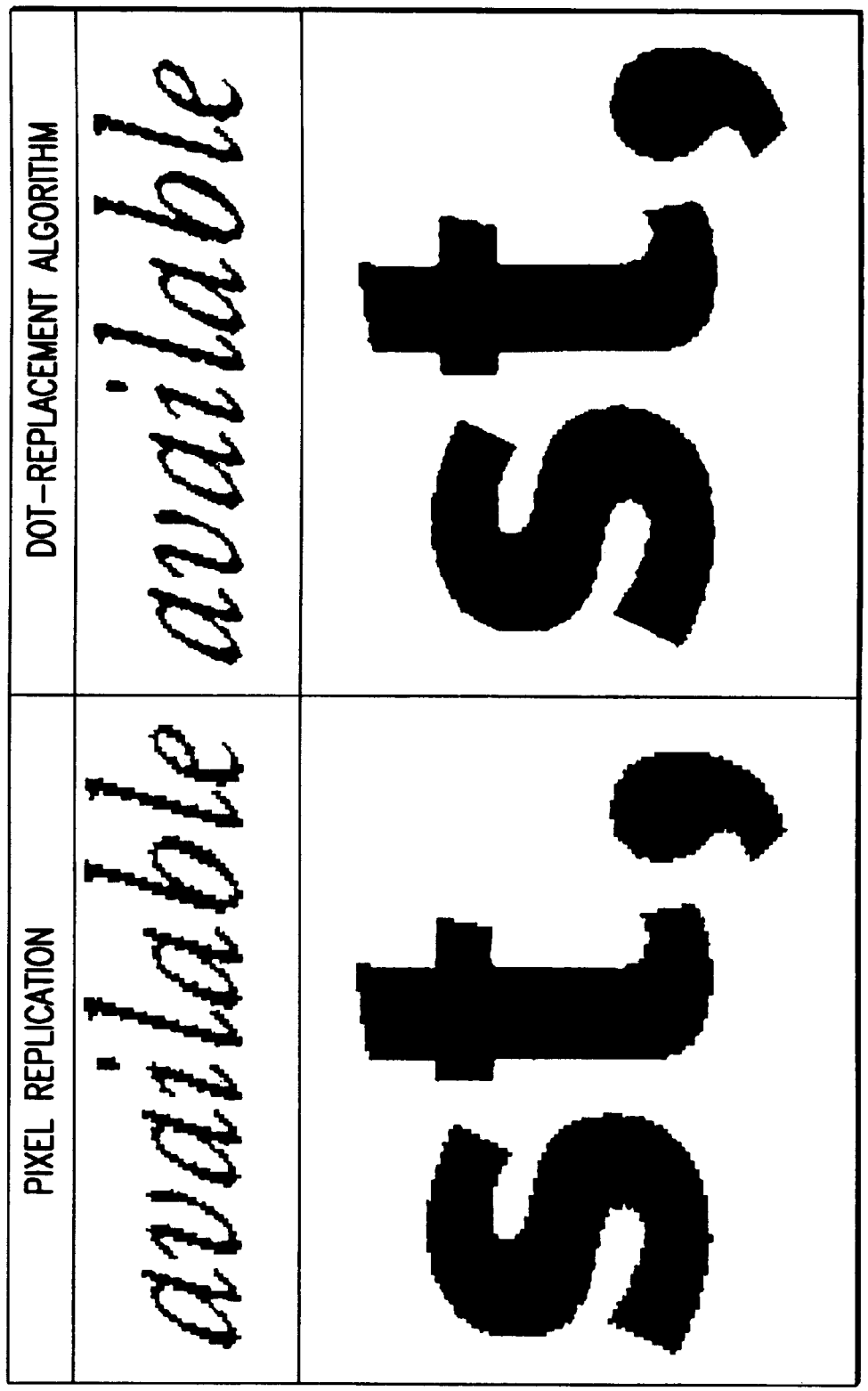
FIG. 7 is an example of an unenhanced bitmapped image and the equivalent image enhanced in accordance with the invention.

The process for assigning values to the expanded pixel elements a, b, c, and d for P(i,j) has been described. This process is performed for all expanded source pixel elements in the bitmapped image so that enhancement of the complete image is achieved. FIG. 7 shows an example of an unenhanced bitmapped image (pixel replicated), and the equivalent image enhanced in accordance with the invention. Smoothing of the jagged edges in the unenhanced image is apparent in the enhanced image.

It will be evident in view of the foregoing description that various modifications may be made within the scope of the present invention. For example, the steps which are described as being performed in the printer driver could equally be performed by software in the printer itself.

What is claimed is:

1. A method of enhancing data which is rendered as a bi-tonal bit-mapped image for subsequent printing on a printer, the method comprising the steps of:

receiving a source bit-mapped image at a first resolution for printing on a printer at a second resolution which is higher than the first resolution, wherein the source bit-mapped image has a plurality of elements, prior to expansion of each element of the source bit-mapped image, convoluting the source bit-mapped image with a gradient operator to generate at least one gradient value for each element of the source bit-mapped image, expanding each element of the source bit-mapped image by a predetermined factor to produce an expanded bit-mapped image at the second resolution for sending to the printer, and assigning a value to each element in the expanded bit-mapped image dependent on the value of associated elements in the source bit-mapped image and the associated at least one gradient value.

2. A method as claimed in claim 1, wherein the second resolution is substantially twice the first resolution.

3. A method as claimed in claim 1, wherein the predetermined factor is an integer number substantially proportional to the square of the quantity comprising the second resolution divided by the first resolution.

4. A method as claimed in claim 1, wherein the step of assigning a value to each element in the expanded bit-mapped image further includes assigning in dependence on the value of neighbouring elements of associated elements in the source bit-mapped image.

5. A method as claimed in claim 1, wherein the step of assigning includes replicating in each element in the expanded bit-mapped image elements the value of the associated source bit-mapped image elements.

6. A method as claimed in claim 5, wherein the step of assigning also includes selectively modifying the replicated values of the expanded bit-mapped image elements, wherein the selection is dependent on the at least one gradient value for the associated elements in the bitmapped image.

7. A method of enhancing data which is rendered as a bi-tonal bit-mapped image for subsequent printing on a printer, the method comprising the steps of:

receiving a source bit-mapped image at a first resolution for printing on a printer at a second resolution which is higher than the first resolution, wherein the source bit-mapped image has a plurality of elements, convoluting the source bit-mapped image with a gradient operator to generate at least one gradient value for each element of the source bit-mapped image, expanding each element of the source bit-mapped image by a predetermined factor to produce an expanded bit-mapped image at the second resolution for sending to the printer, and assigning a value to each element in the expanded bit-mapped image dependent on both the value of associated elements in the source bit-mapped image and the associated at least one gradient value generated in the convolution step.

8. A method of enhancing data which is rendered as a bi-tonal bit-mapped image for subsequent printing on a printer, the method comprising the steps of:

receiving a source bit-mapped image at a first resolution for printing on a printer at a second resolution which is higher than the first resolution, the source bit-mapped image having a first element and surrounding elements adjacent to the first element, convoluting the source bit-mapped image with a gradient operator to generate at least one gradient value for the first element of the source bit-mapped image, expanding the first element of the source bit-mapped image by a predetermined factor to produce a plurality of elements in an expanded bit-mapped image at the second resolution, and determining values of the plurality of elements in the expanded bit-mapped image, including:

if the gradient value generated in the convolution step equals to a predetermined value, assigning a first value that is the same as a value of the first element of the source bit-mapped image to the plurality of elements in the expanded bit-mapped image, and if the gradient value generated in the convolution step does not equal to the predetermined value, assigning a second value that is dependent on values of the surrounding elements of the source bit-mapped image to at least one of the plurality of the elements in the expanded bit-mapped image, and assigning the first value to remaining elements of the plurality of the elements in the expanded bit-mapped image.

* * * * *